(No Model.)
H. LINDESTRÖM.
COMPENSATING LEVER, &c.
No. 492,730. Patented Feb. 28, 1893.
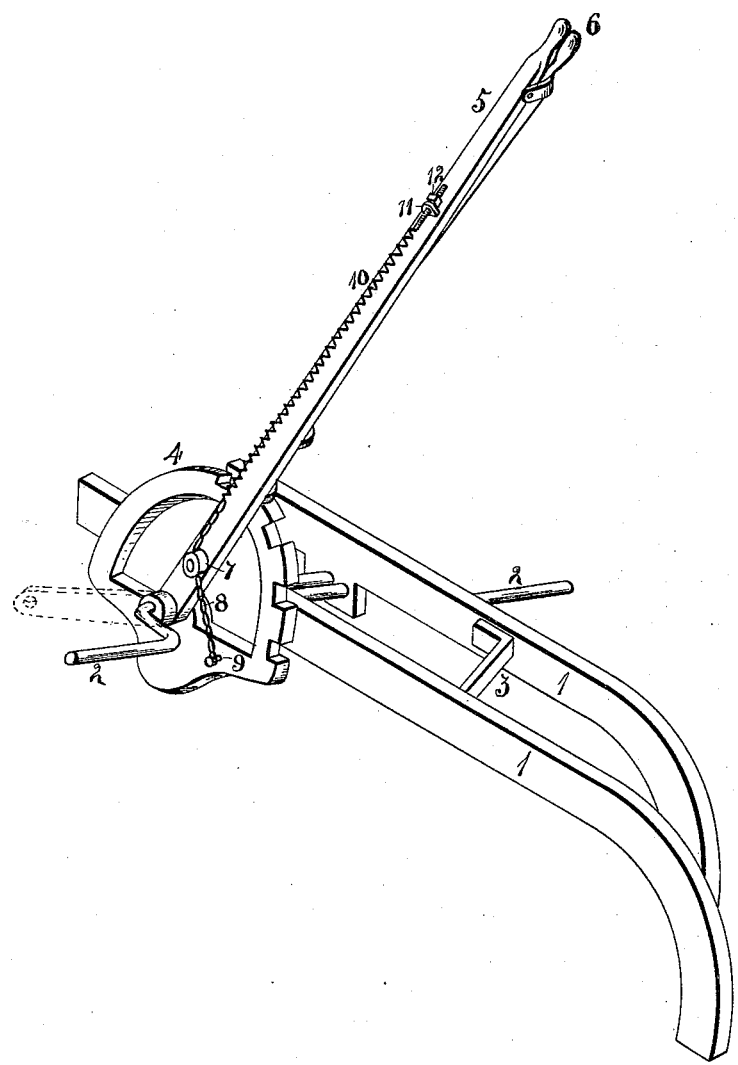
Witnesses:
B. Blinn
A. Davenport
Inventor:
Hjalmar Lindeström
By A. O. Behel
Atty.

UNITED STATES PATENT OFFICE.

HJALMAR LINDESTRÖM, OF MOLINE, ILLINOIS.

COMPENSATING LEVER, &c.

SPECIFICATION forming part of Letters Patent No. 492,730, dated February 28, 1893.

Application filed October 24, 1892. Serial No. 449,884. (No model.)

*To all whom it may concern:*

Be it known that I, HJALMAR LINDESTRÖM, a subject of the King of Sweden, residing at Moline, in the county of Rock Island and State of Illinois, have invented certain new and useful Improvements in Compensating Levers for Plows and other Agricultural Implements, of which the following is a specification.

The object of this invention is to construct a lever for plows or other agricultural implements, in which a spring has a connection with the lever and a stationary support, and the roller located on the lever over which the spring mechanism passes, in such a manner that when the lever is raised to a vertical position the tension of the spring is increased, so that when the lever is released by the attendant the spring will assist in lifting the parts of the implement having a connection with the lever.

In the drawings I have shown an isometrical representation of my improved lever in its application to the axle of a gang plow.

The beams 1, support the plows at their rearward ends, their forward ends being connected by an axle 2, and a rearward brace 3. A toothed segment 4 is secured to one of the plow beams, and a lever 5 in this instance is pinned to the axle, and has the ordinary thumb latch, 6, connection with the toothed segment. A roller 7 has a pivotal connection with the lever 5 near its lower end, over which passes a chain 8, having its lower end connected to the stationary pin 9, its upper end connected with a spring 10; the upper end of the spring having a connection with the lever 5, in an adjustable manner, by means of the ear 11 and nut 12.

When my improved compensating lever is used in connection with a plow, as shown in the drawings, its lower end is connected with the axle 2, which is the center of the toothed segment 4. The operator in raising the plows moves the lever backward, and by the spring connection between the lever and the stationary part of the frame, the spring will exert its force to assist the operator in raising the beams. It will be noticed that when the lever is raised above a horizontal position the distance between the roller 7 and pin 9 is increased, which increases the tension of the spring, and upon the hand lever being released from its engagement with the toothed segment the action of the spring is to return the lever to a horizontal position, thereby assisting the operator to raise the plow beams.

In some constructions of agricultural implements it may be necessary to provide the hand lever with an extension, shown in dotted lines, said extension having a connection with the parts to be operated upon.

I claim as my invention—

1. In a compensating lever, the combination of a pivoted lever, a roller having a connection therewith near its pivot, a spring having a connection with the lever near its free end and its other end having a flexible connection with a stationary support, said flexible connection passing over the roller.

2. In a compensating lever, the combination of a pivoted lever, a toothed segment, a detent for the lever, a roller having a connection with the lever near its pivot, a spring having a connection with the lever near its free end and its other end having a flexible connection with a stationary support, said flexible connection passing over the roller.

HJALMAR LINDESTRÖM.

Witnesses:
LOUIS EDLUND,
J. B. OAKLEAF.